(12) United States Patent
Wetzel

(10) Patent No.: US 7,532,221 B2
(45) Date of Patent: *May 12, 2009

(54) TEXTURE-BASED PACKING, SUCH AS FOR PACKING 16-BIT PIXELS INTO FOUR BITS

(75) Inventor: Michael Scott Wetzel, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 458 days.

This patent is subject to a terminal disclaimer.

(21) Appl. No.: 10/979,962

(22) Filed: Nov. 2, 2004

(65) Prior Publication Data

US 2006/0092167 A1 May 4, 2006

(51) Int. Cl.
*G09G 5/00* (2006.01)
(52) U.S. Cl. .................. 345/582; 345/428; 345/471; 345/552; 345/589; 345/592; 345/601; 345/605; 345/612; 382/166; 382/232
(58) Field of Classification Search ............... 345/612
See application file for complete search history.

(56) References Cited

U.S. PATENT DOCUMENTS

| | | | | |
|---|---|---|---|---|
| 5,565,886 A * | 10/1996 | Gibson | ................ | 345/611 |
| 5,822,452 A * | 10/1998 | Tarolli et al. | ................ | 382/166 |
| 6,459,433 B1 * | 10/2002 | Walton | ................ | 345/582 |
| 6,466,224 B1 * | 10/2002 | Nagata et al. | ................ | 345/592 |
| 6,731,295 B1 * | 5/2004 | MacInnis et al. | ................ | 345/581 |
| 6,819,324 B2 * | 11/2004 | Emberling | ................ | 345/540 |
| 6,819,793 B1 * | 11/2004 | Reshetov et al. | ................ | 382/166 |
| 6,937,250 B1 * | 8/2005 | Schilling et al. | ................ | 345/582 |
| 7,035,458 B1 * | 4/2006 | Chien | ................ | 382/166 |
| 7,038,695 B2 * | 5/2006 | Lin et al. | ................ | 345/582 |
| 7,058,218 B1 * | 6/2006 | Drebin et al. | ................ | 382/167 |
| 7,129,956 B2 * | 10/2006 | Hollis et al. | ................ | 345/592 |
| 7,358,975 B2 * | 4/2008 | Wetzel | ................ | 345/582 |

* cited by examiner

*Primary Examiner*—Antonio A Caschera
(74) *Attorney, Agent, or Firm*—Perkins Coie LLP

(57) ABSTRACT

A method and system for rendering three-dimensional graphics, including text, provides a compressed texture bitmap. The compressed texture bitmap may represent multiple symbols, each comprised of multiple pixels. Each pixel in the texture bitmap may store information for more than one value, including values for compressed pixels corresponding to multiple distinct symbols. For example, the compressed texture bitmap may have n-bit pixels (e.g., 16-bit pixels) that each store up to m (e.g., four) n/m-bit (e.g., 4-bit) compressed values. Multiple pixels can be stored in a single texture using, for example, distinct red, green, blue, and alpha (RGBA) channels associated with each pixel. The compressed texture bitmap may be configured for unpacking by a conventional pixel shader, such as a pixel shader that does not typically perform bitwise operations. The unpacking may include isolating a pixel associated with a desired value using a masking operation in the pixel shader.

24 Claims, 12 Drawing Sheets
(6 of 12 Drawing Sheet(s) Filed in Color)

This text is using a two-bit (anti-aliased) font.
This font scales well

*FIG. 10*

TEXTURE-BASED PACKING, SUCH AS FOR PACKING 16-BIT PIXELS INTO FOUR BITS

BACKGROUND

Advances in computer graphics allow for the display of three-dimensional graphical objects (e.g., characters in a video game) in a two-dimensional space (e.g., a computer screen or monitor). Video games and other applications that use three-dimensional graphics appear very lifelike to a user, and add to the user's enjoyment of the experience. One technique for generating three-dimensional graphics includes the use of textures. A texture is a two-dimensional bitmap typically used to simulate real world texture detail (e.g., wood, grain, carpet, etc.) when drawing otherwise flat geometry in a three-dimensional rendering of a scene. In some cases, the texture is made up of multiple two-dimensional pixels. Each pixel has the properties of position, color, brightness, and depth. Once created, the texture can be used for rendering images of many types, including images representing text or symbols. Using textures for rendering two-dimensional text is generally desirable over other text-rendering techniques because textures allow the text to be easily projected, scaled, and rotated as appropriate.

Because video games do not market well unless they are visually impressive, it is desirable to have multiple attractive fonts used in one scene. Accordingly, a single texture for use in text rendering in an application (e.g., a three-dimensional video game) may include a large set of glyphs (e.g., the text characters, symbols, and/or images that go along with a certain font or text style). In some cases, the glyphs may be individually colored or may be white characters with a black outline, a black drop-shadow, and/or anti-aliasing effects. Outline and drop-shadow features typically improve readability on a low-resolution display (e.g., a television), especially in cases where background colors do not provide much contrast. Anti-aliasing reduces the stair-stepped effect of pixel-generated lines, and includes using gray or lightly colored pixels near the outline of a glyph. FIG. 1 shows an example of a glyph 102 with anti-aliasing, outlining, and drop-shadow features. To incorporate such features, each pixel in a texture bitmap is typically 32 bits, with eight bits for each color channel (e.g., red, green, blue) and eight bits for an alpha channel that is used as a transparency factor. In most cases, a moderately sized set of glyphs can fit into a 256×256 texture bitmap. FIG. 1 also shows an example of a 512×256 texture bitmap 104.

Text rendering from a texture typically involves selecting a set of texture coordinates that match where a desired glyph resides in the texture (e.g., the coordinates that make up the letter "G"). In more complex systems, built-in support for fonts and similar text-rendering solutions simplify text rendering at the application end. However, such built-in solutions are not always available in the context of video games. For example, current generation video game consoles do not have built-in support for fonts. Likewise, games developed for personal computers typically require higher performance text-rendering solutions than what is typically provided by the personal computer's operating system.

For these reasons, today's video games often provide their own text-rendering support. There are two primary methods for text rendering in video games. In a first method, the CPU of the computer or console writes bits directly onto a render target. While this technique allows text to be rendered with industry standard True Type font files, there are numerous crippling disadvantages relating to high memory usage and performance. For example, since not all video game consoles have enough memory to devote to such potentially large font files, the CPUs often resort to caching the files, which further hurts run-time performance. Furthermore, most CPUs are poorly suited for rendering bitmaps. For example, a typical CPU renders fonts 100 to 1000 times slower than a graphics processing unit (GPU).

The second method is to store the font as a bitmapped texture and render individual glyphs as screen-space aligned quads (e.g., using a GPU's texture rasterizer). This technique uses native functionality of the GPU to render bitmap-based fonts at a full fill rate (measured in pixels per second) of the hardware associated with the GPU. One limitation of this technique is that, when employed with large character sets (e.g., the Unicode character set), it may require texture sizes that exceed current hardware capabilities and use large amounts of memory.

The problems with current text-rendering techniques are exacerbated when creating video games for international markets. For example, a game including Chinese text may require around 5000-8000 glyphs. If each glyph were pre-rendered into a 20×20 pixel section of a texture bitmap, then the entire texture bitmap would be 1800×1800 pixels, or 3.24 MPixels. Because most game consoles support only a limited amount of texture formats, the minimum space requirement when using an 8-bit-per-pixel texture is 3.24 MB. With a 16-bit-per-pixel texture (four bits for each red, green, blue, and alpha channel) the minimum space requirement is 6.48 MB. Because a typical video game console has only about 32-64 MB of physical memory and about 26-58 MB of usable memory, it is unreasonable to devote this much memory to text and fonts.

SUMMARY

A method and system for rendering of three-dimensional graphics including text, allows an uncompressed texture bitmap to be compressed. The compressed texture bitmap may include values that may be unpacked into output pixels that can be used to render text symbols and other glyphs. Each pixel in the compressed texture bitmap may store information for more than one value, including values for compressed pixels corresponding to multiple distinct symbols. For example, the compressed texture bitmap may have pixels having a size of n bits (e.g., 16-bit pixels) that each store up to m values (e.g., four values). Each of the m values may have a size of up to n/m bits (e.g., four bits) compressed values. Multiple values can be stored in a single pixel using, for example, distinct red, green, blue, and alpha (RGBA) channels associated with the pixel.

The compressed texture bitmap may be configured for unpacking by a conventional pixel shader, such as a pixel shader that does not typically perform bitwise operations. The unpacking may include isolating a pixel associated with a desired value using a masking operation in the pixel shader.

In another embodiment of the invention, a compressed texture bitmap may have pixels with a size of n bits (e.g., 8-bit pixels) that each store m (e.g., four) compressed value having a size of n/m bits (e.g., 2-bit values). The compressed texture bitmap may be configured for unpacking by a conventional pixel shader, such as a pixel shader that does not typically perform bitwise operations. For example, the unpacking may include matching a fetched 8-bit pixel to a mapping value in a lookup table, such as a 32-bit value from a 256-color palette. The looked-up mapping value can be separated into separate sub-values to facilitate processing by the pixel shader. For example, the looked-up value can be split into RGBA values conventionally used in processing colored pixels.

In yet another embodiment of the invention, a compressed texture bitmap may have pixels of a size of n bits (e.g., 8-bit pixels) pixels that each store n 1-bit values. The compressed texture bitmap may be configured for unpacking by a conventional pixel shader, such as a pixel shader that does not typically perform bitwise operations. The unpacking may include matching a fetched pixel to a mapping value in a lookup table, such as a 32-bit value from a 256-color palette. The looked-up value can be separated into separate sub-values to facilitate processing by the pixel shader. For example, the looked-up value can be split into RGBA values conventionally used in processing colored pixels.

BRIEF DESCRIPTION OF THE DRAWINGS

The patent application contains at least one drawing executed in color. Copies of this patent application with color drawings will be provided by the Office upon request and payment of the necessary fee.

FIG. 10 is a display diagram showing an example of scaling of a font that has been compressed down to two bits-per-pixel in one embodiment.

Figure 1:
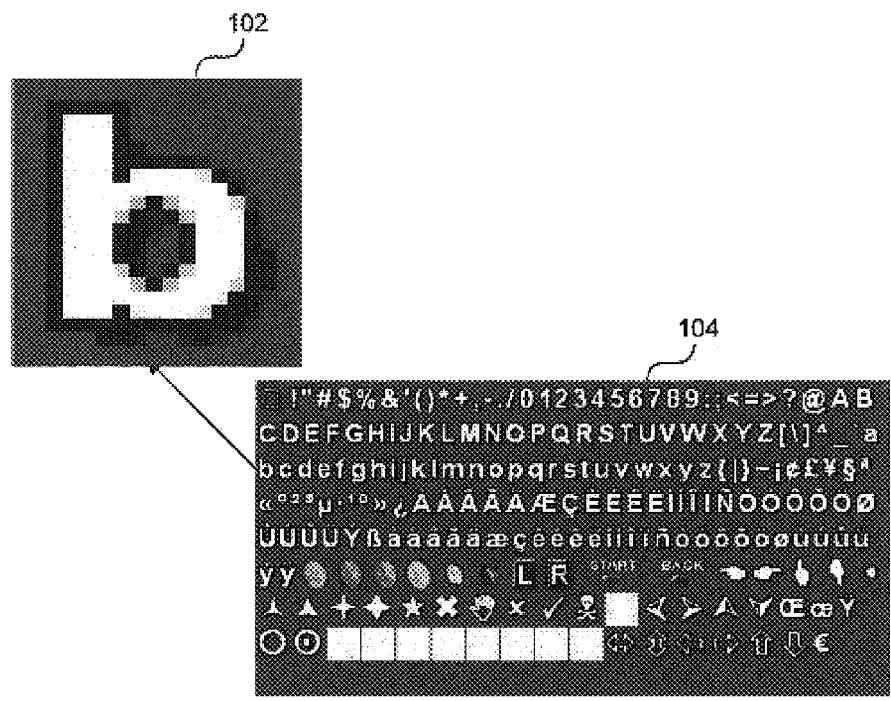
FIG. 1 is a block diagram showing an example of a conventional texture bitmap.

In the drawings, the same reference numbers identify identical or substantially similar elements or acts. To facilitate the discussion of any particular element or act, the most significant digit or digits in a reference number refer to the figure number in which that element is first introduced (e.g., element 204 is first introduced and discussed with respect to FIG. 2).

A portion of this disclosure contains material to which a claim for copyright is made. The copyright owner has no objection to the facsimile reproduction by anyone of the patent document or patent disclosure (including Figures), as it appears in the Patent and Trademark Office patent file or records, but reserves all other copyright rights whatsoever.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

I. Overview

The methods and systems described herein allow packing and unpacking of bitmaps used to represent font textures used in rendering text, symbols, and other glyphs. Using such techniques, an application may provide very large-sized glyph sets without overburdening memory resources provided by the hardware running the application. For example, in some embodiments, a font-packing tool compresses a 16-bit-per-pixel font bitmap down to four bits-per-pixel (with a source pixel including information used to generate one output pixel for display on a screen or other display device). In other embodiments, a font-packing tool compresses an 8-bit-per-pixel font bitmap down to two bits-per-pixel. In yet other embodiments, a font-packing tool compresses an 8-bit-per-pixel font bitmap down to one bit-per-pixel. The method and system also allow unpacking of a compressed font bitmap via a graphics processing unit including a conventional pixel shader.

II. Representative System

Figure 2:
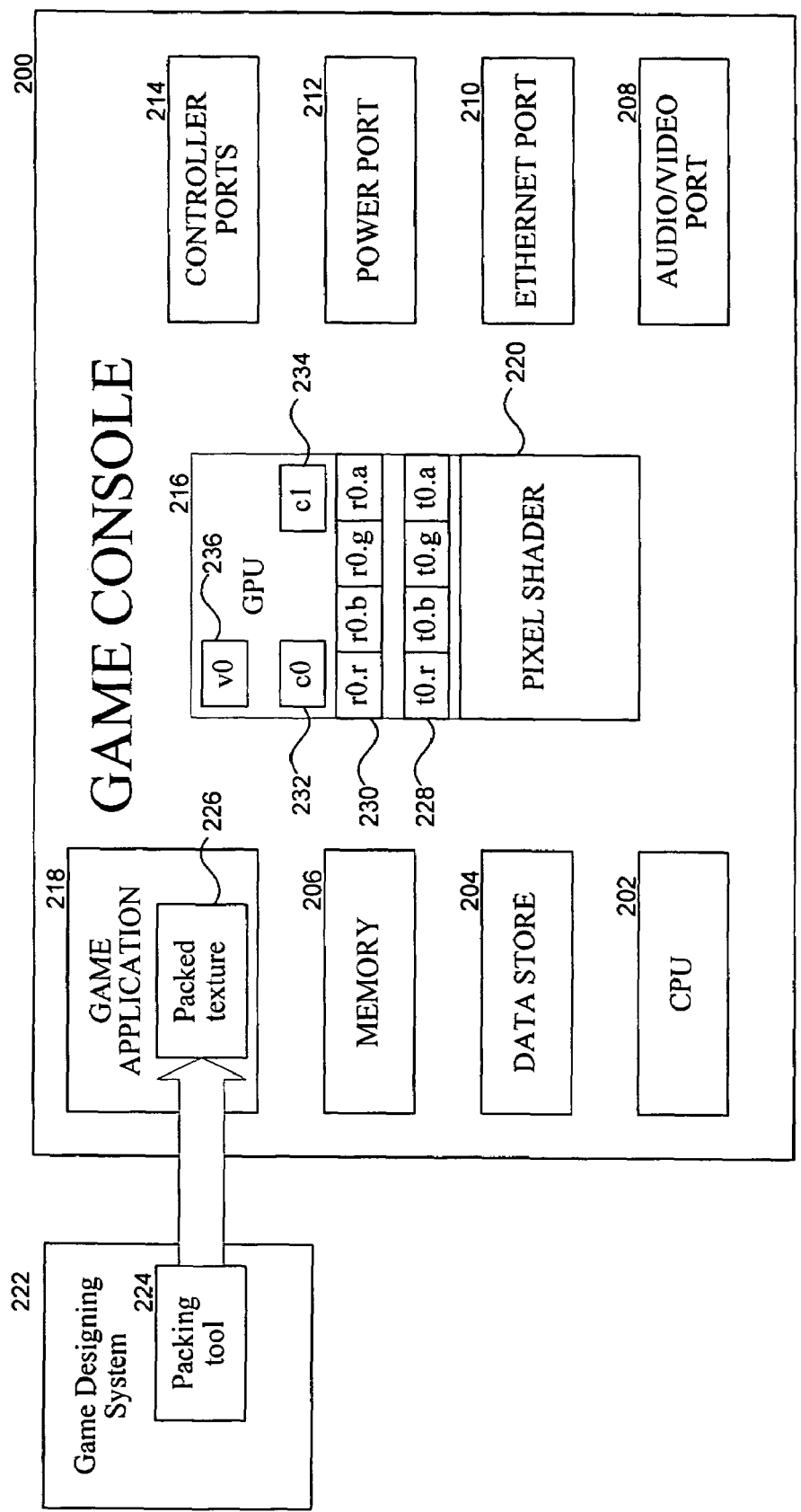
FIG. 2 is a block diagram showing an example of an environment in which the invention may be implemented in one embodiment.

FIG. 2 and the following discussion provide a brief, general description of a representative environment in which the invention can be implemented. Although not required, aspects of the invention are described in the general context of computer-executable instructions, such as routines executed by a general-purpose computer (e.g., a server computer, wireless device, or personal/laptop computer). Those skilled in the relevant art will appreciate that the invention can be practiced with other communications, data processing, or computer system configurations, including Internet appliances, hand-held devices (including personal digital assistants (PDAs)), wearable computers, all manner of cellular or mobile phones, embedded computers (including those coupled to vehicles), multi-processor systems, microprocessor-based or programmable consumer electronics, set-top boxes, network PCs, minicomputers, mainframe computers, and the like. Indeed, the terms "computer," "host," and "host computer" are generally used interchangeably and refer to any of the above devices and systems, as well as any data processor.

Aspects of the invention can be embodied in a special-purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communication network. In a distributed computing environment, program modules may be located in both local and remote memory storage devices.

Aspects of the invention may be stored or distributed on computer-readable media, including magnetically or optically readable computer disks, as microcode on semiconductor memory, nanotechnology memory, organic or optical memory, or other portable data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or may be provided on any analog or digital network (packet-switched, circuit-switched, or other scheme). Those skilled in the relevant art will recognize that portions of the invention reside on a server computer, while corresponding portions reside on a client computer, such as a mobile device.

Referring to FIG. 2, the representative environment in which the texture packing and unpacking techniques can be practiced includes a game console 200. The game console may include a CPU 202, a data store 204, a memory 206, an audio/video port 208, an Ethernet port 210, a power port 212, and one or more controller ports 214. In addition, the game console 200 may include a graphics processing unit (GPU) component 216 including a pixel shader 220. The pixel shader 220 may be of a conventional design. For example, it may offer few if any bitwise operations, and may be controlled using a limited instruction set.

In some embodiments, the GPU component 216 processes packed and unpacked textures provided by a game application 218 that runs on the game console 200. The game application 218 in the illustrated embodiment includes a packed font texture 226. In some embodiments, the packed font texture 226 is created at game application development time. A designer of the game application may use a designing system 222, including a packing tool 224 to generate the packed font texture 226. As illustrated, the game designing system 222 is external to the game console.

The packed font texture 226 may be in bitmap form and may include a set of glyphs (e.g., text characters, symbols, etc.). When outputted, each glyph may be made up of multiple pixels, with each source pixel including information used to generate one output pixel for display on a screen or other display device. The bitmap itself is made up of multiple pixels, with each pixel having more than one channel. This configuration allows each pixel of the bitmap to hold or represent more than one value. For example, some pixels of the packed font texture 226 may include multiple 4-bit values, multiple 2-bit values, or even multiple 1-bit values, as described further herein. Accordingly, when viewed as a bitmap on a display screen, the packed font texture 226 may appear to have multiple overlapping glyphs.

To facilitate the processing of source pixels to generate output pixels, the GPU component 216 may include several registers that store values used in unpacking textures. For example, the GPU component 216 may include a t0 register 228 for storing pixels fetched by the pixel shader 220 from the texture during unpacking. In some embodiments, the t0 register 228 includes space for separating out the information relating to various channels of the pixel. Likewise, the GPU component 216 may include an r0 register 230 for storing pixel information. Like the t0 register 228, the r0 register 230 may include space for storing separate values related to the pixel. In addition, the GPU may contain a c0 register 232 and a c1 register 234 for storing constant values (e.g., mask values) used in unpacking. The GPU component 216 may also contain a v0 register 236 that stores interpolated vertex color values for the current pixel. In this way, the pixel shader 220 can assign a color value to any fetched and uncompressed pixel. The GPU component 216 may include other registers (e.g., an instruction register)(not shown).

The following sections of this Detailed Description provide examples of texture packing and unpacking. For example, examples relating to 16-bit to 4-bit compression, 8-bit to 2-bit compression, and 8-bit to 1-bit compression are provided. The examples are illustrated using a combination of block diagrams, display diagrams, and flow diagrams. These diagrams do not show all possible data structures, configurations, formats, and routines but, instead, provide an understanding of packing and unpacking of textures within the system. Those skilled in the relevant art will recognize that some data structures, configurations, formats, and routines may be repeated, varied, omitted, or supplemented, and other aspects not shown may be readily implemented.

III. Texture Compression (1) Sixteen Bit-Per-Pixel to Four Bit-Per-Pixel Compression FIGS. 3-6 correspond to techniques for packing and unpacking font textures having pixels that can be compressed down to four bits while still retaining features such as anti-aliasing, drop-shadowing, and outlining. In general, a 16-bit-per-pixel texture is used for applications that have colorful text and/or that embed custom-drawn features into a font (e.g., arrows, graphics, etc.) Such a texture may be configured using a variety of formats. An example of such a format is a format provided by Microsoft's DirectX 8 class hardware, in which each channel (e.g., red, green, blue, alpha) of a pixel is assigned four bits. This format allows for 16 independent values of red, 16 of green, and so on, which is enough for most color images, including artist-colored images.

Figure 3:
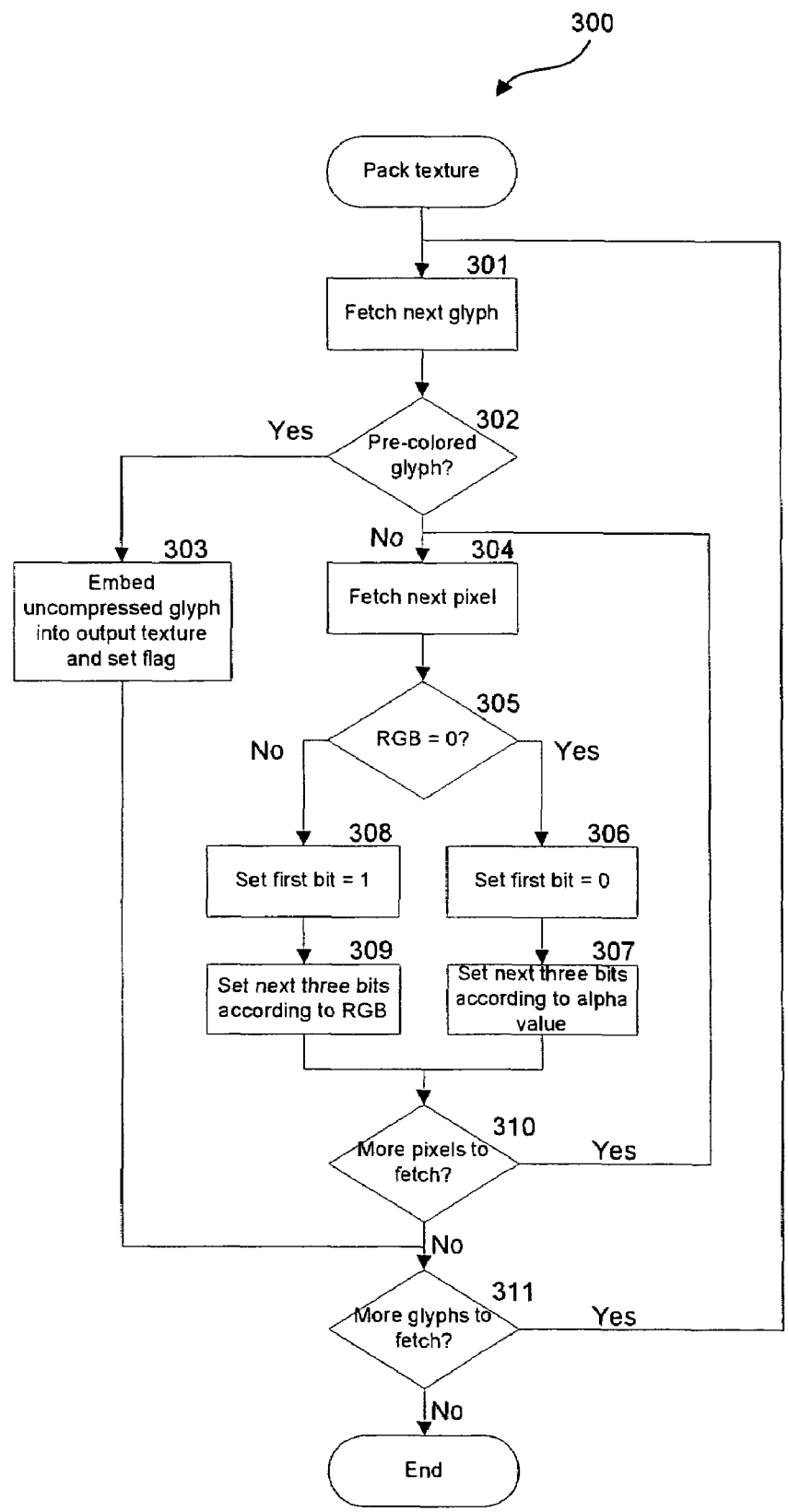
FIG. 3 is a flow diagram showing a sixteen bit to four bit texture packing routine in one embodiment.
Figure 4:
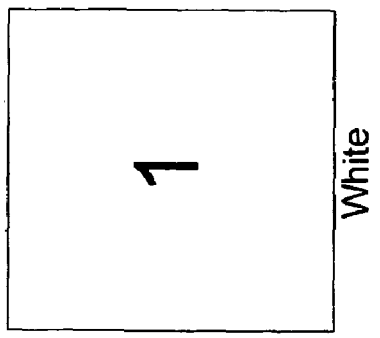
FIG. 4 is a block diagram showing an example of data structures used for storing a 4-bit value in a compressed texture bitmap in one embodiment.
Figure 4:
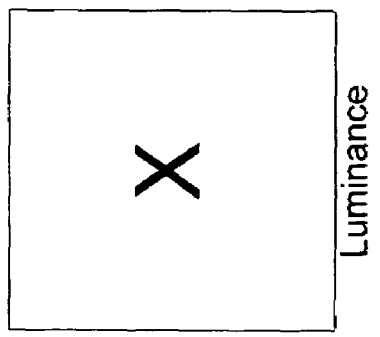
Figure 4:
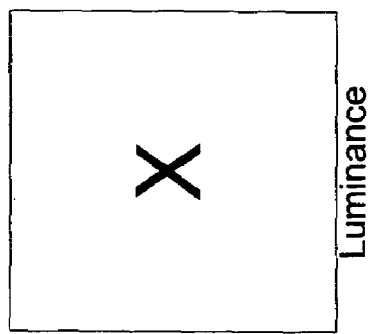
Figure 4:
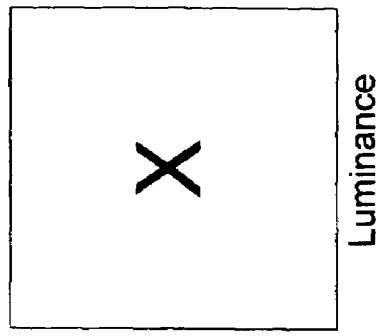
Figure 4:
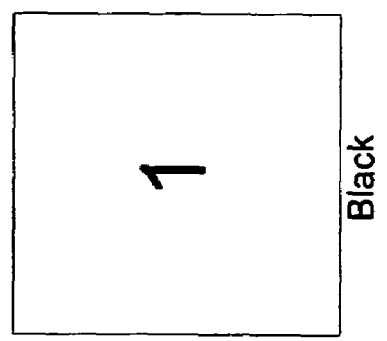
Figure 4:
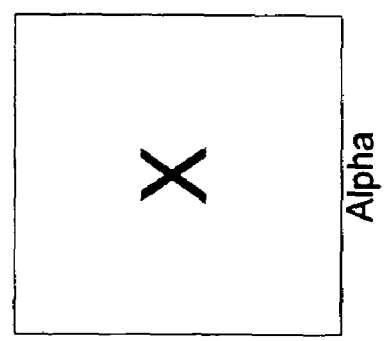
Figure 4:
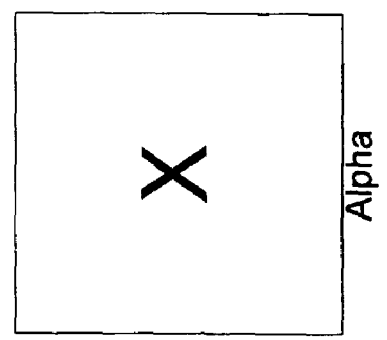
Figure 4:
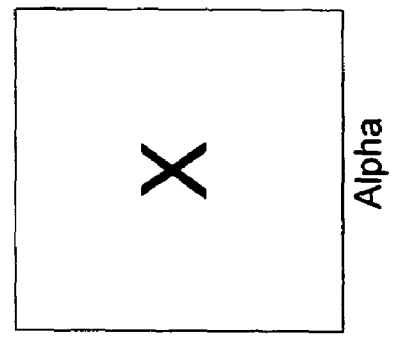

FIG. 3 shows an example of a routine 300 for packing a 16-bit-per-pixel texture down to four bits-per-pixel. When used in conjunction with a complementary unpacking routine, such as the unpacking routine 600 of FIG. 6, the packing routine 300 may preserve desired features of the original texture (e.g., anti-aliasing, outlining, and drop-shadowing) and allow for the use of colored fonts. In addition, the packing routine 300 may allow pre-colored/custom glyphs in the same texture bitmap (however, in some embodiments, such pre-colored/custom glyphs remain in a 16 bit-per-pixel format). In some embodiments, portions of the packing routine 300 are performed by a packing tool that performs bitwise operations.

The packing routine 300 packs texture bitmaps by using a grayscale where black or transparent appears as black, white appears as white, and colors appear as shades of gray. In general, the packing routine 300 assumes that white pixels fade from white to gray to black (based on a corresponding luminance value) and that black pixels fade from black to semi-opaque to transparent. For 16-bit black, white, and gray pixels, the red, green, blue (RGB) channels of the pixel contain identical values (e.g., (15, 15, 15) for white), meaning that only a single 4-bit RGB value (ranging from decimal value 0-15) is needed to represent the grayscale value (luminance) of any one gray pixel. In some embodiments, appropriate color information can be added to gray pixels during unpacking using a modulation technique where color information stored in an underlying vertex is used in the real-time rendering system.

According to this scheme, the packing routine 300 may allocate four bits for each 16-bit pixel in a glyph as follows: The routine 300 allocates a first bit to represent either a white/gray pixel or a black/transparent pixel. The routine 300 allocates second, third, and fourth bits to represent either information on grayscale luminance (for white/gray pixels) or information on alpha transparency (for black/transparent pixels). An example of this format is illustrated with respect to FIG. 4.

Referring back to FIG. 3, in some embodiments, the packing routine 300 begins at block 301, where it fetches a first glyph from the original texture. At decision block 302, the packing routine 300 checks the fetched glyph to determine whether it is a pre-colored/custom glyph. At decision block 302, if the fetched glyph is a pre-colored/custom glyph, the routine 300 proceeds to block 303, where the packing routine 300 embeds the uncompressed glyph into an output texture in its 16-bit form (without packing) and sets a flag indicating that the glyph is not packed. From block 303, the packing routine 300 proceeds to block 311 to determine whether the original texture includes remaining glyphs for fetching.

If, however, at decision block 302 the fetched glyph is not associated with a pre-colored/custom glyph, the packing routine 300 proceeds to block 304 to fetch a next pixel of the fetched glyph. After fetching the next pixel, the routine 300 proceeds to decision block 305, where it checks of the RGB values of the fetched pixel are all equal to zero (meaning that the fetched pixel is black or transparent). If the RGB values of the fetched pixel are all equal to zero, then the packing routine 300 proceeds to block 306 to set the first four available pixels to zero. Next, at block 307 the packing routine 300 sets the next three pixel bits according to the alpha value of the fetched pixel. For example, if the alpha value of the fetched pixel is zero (e.g., for a completely translucent pixel) the packing routine 300 sets the next three pixel bits to (0, 0, 0). If however, the alpha value of the fetched pixel is greater than zero, the routine sets the next three pixel bits according to the three most significant bits of the fetched pixel's 4-bit alpha value, with a binary alpha value ranging from 001-111. (Later, an unpacking routine may shift these three bits to the left one space, allowing for a maximum alpha value of binary 1111 or decimal 15 (i.e., a nontranslucent black pixel).) The packing routine 300 then proceeds to decision block 310, where it checks whether the original texture has more bits to fetch.

If, however, at decision block 305 the RGB values of the fetched pixel are greater than zero (meaning that the fetched pixel is white or colored) the packing routine 300 continues at block 308, where it sets the first of the four available pixel bits equal to one. Next, at block 309, the packing routine 300 sets the remaining three pixel bits to present a luminance value ranging from binary 000-111. Because the packing routine 300 treats each of the original 16-bit pixels as being either white, gray, or black, the RGB values are identical for each pixel (e.g., red=1110, green=1110, blue=1110). Thus, the assigned 3-bit luminance value may correspond approximately to the three most significant bits of any of the three 4-bit RGB values for any given pixel. During unpacking of the font texture, these bits can be shifted one space to the left, thus matching the 4-bit RGB value of the original 16-bit pixel.

As a result of the above steps, a 16-bit pixel from the original texture can be stored in four bits in the new texture. For example, the packing routine 300 may embed the 4-bit pixel into the new 16-bit-per-pixel texture bitmap by assigning it to a single channel (e.g., red, green, blue, or alpha) corresponding to one pixel of the new 16-bit texture.

The routine 300 then continues at decision block 310, where it checks if there are additional pixels to fetch relating to the glyph. If at decision block 310 there are additional pixels to fetch, the routine 300 loops back to block 304 to fetch the next pixel. Otherwise, the routine proceeds to decision block 311 to determine whether there are additional glyphs to fetch in the texture. Based on this decision, the routine 300 either ends (if there are no additional glyphs to fetch), or loops back to block 301 to fetch the next glyph.

Figure 5:
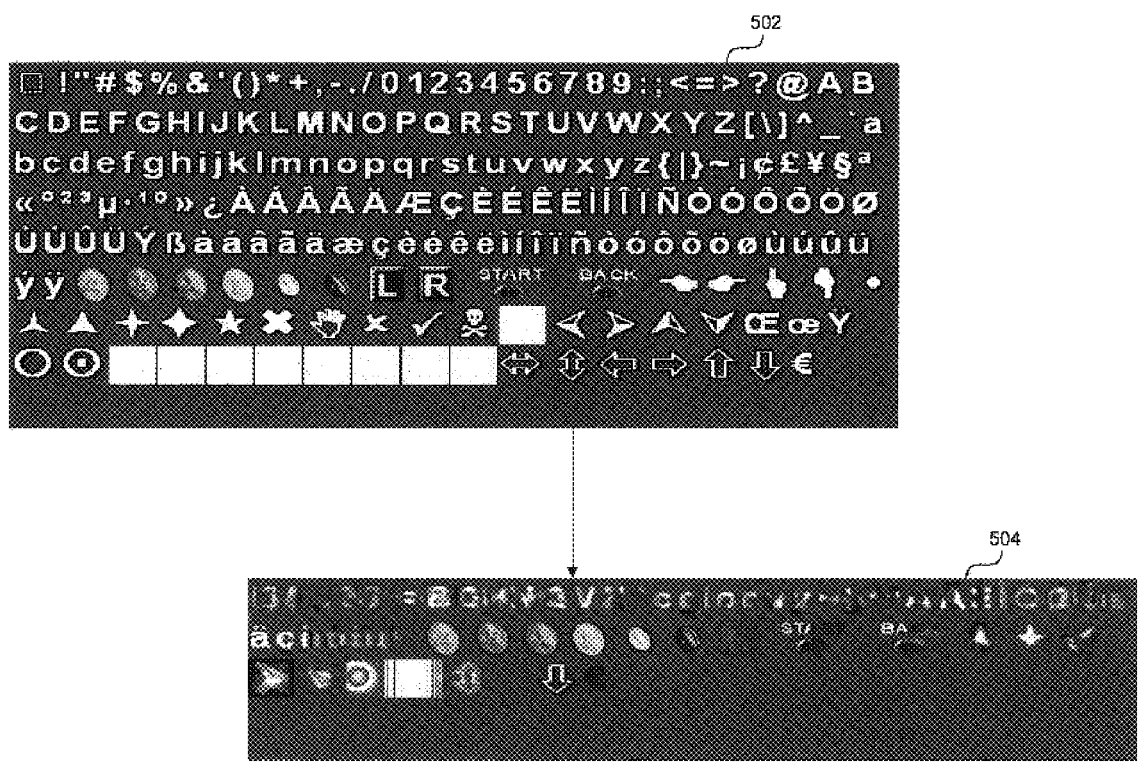
FIG. 5 is a display and flow diagram illustrating an example of a sixteen bit-per-pixel texture bitmap being compressed down to four bits-per-pixel in one embodiment.

As shown in FIG. 5, execution of the packing routine 300 on a 16-bit-per-pixel bitmap 502 may result in a new texture bitmap 504 that appears as a series of overlapped glyphs, with each glyph occupying a unique 4-bit channel of each available pixel. However, as illustrated, any pixels that correspond to custom or pre-colored glyphs may be left in a 16-bit format using all four channels.

Figure 6:
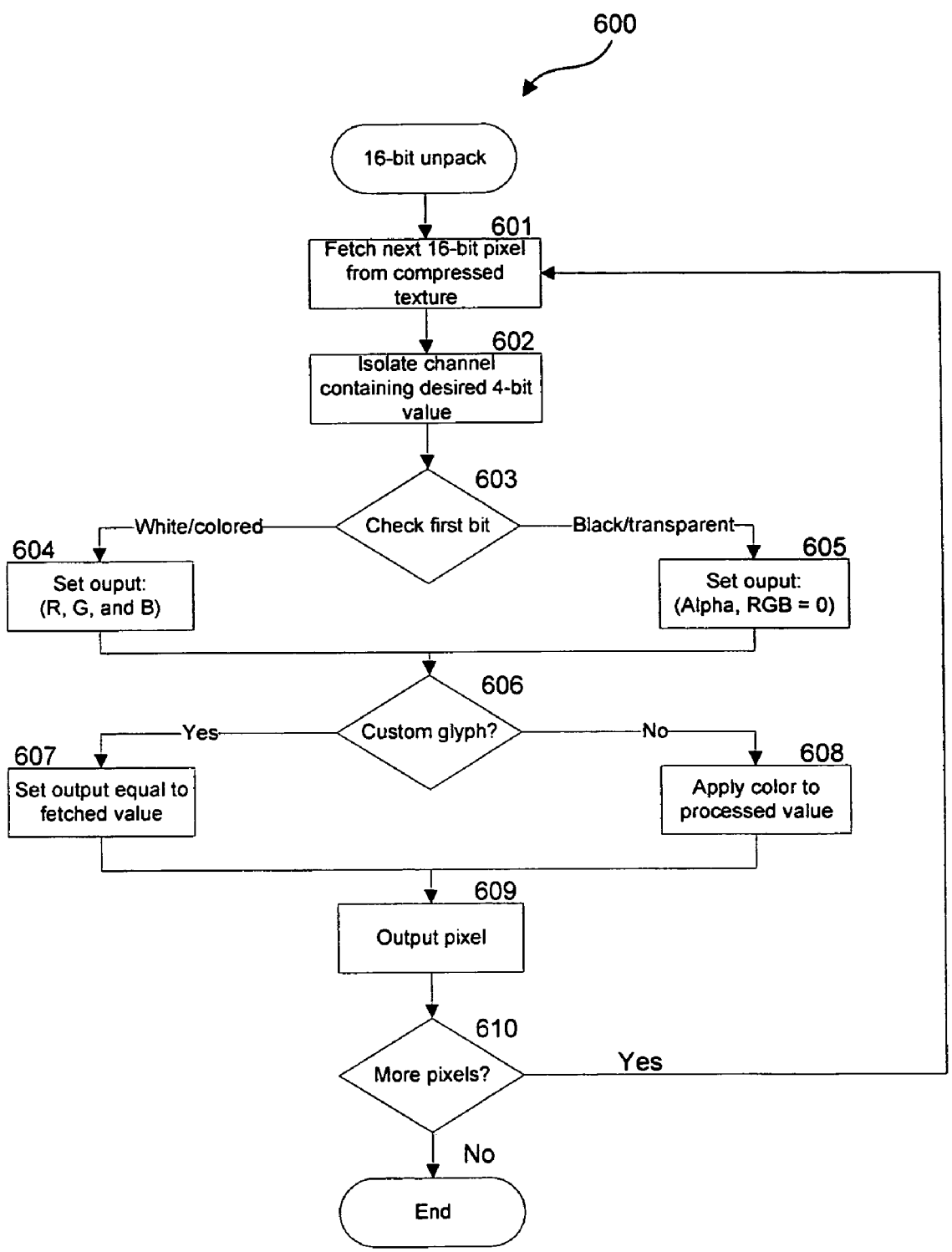
FIG. 6 is a flow diagram showing a routine for unpacking a texture bitmap that has been compressed into a 4-bits-per-pixel format in one embodiment.

An example of a routine for unpacking a compressed texture bitmap, such as the texture bitmap 504 of FIG. 5, is illustrated in FIG. 6. The unpacking routine 600 may be performed, at least in part, in a pixel shader that receives instructions from an application (e.g., a video game application) that contains the compressed texture. The pixel shader may be implemented in hardware associated with a GPU component, such as a GPU of a game console. Accordingly, the specific pixel shader instructions described with respect to the unpacking routine 600 conform to a protocol understood by the particular pixel shader hardware of the illustrated embodiment. However, one skilled in the art would understand that a similar or modified routine may be performed in many different types of pixel shaders (or other hardware/software) without departing from the scope of the invention.

At block 601, the unpacking routine 600 fetches a 16-bit pixel from the compressed font texture. For example, a pixel shader instruction such as the following may be used to fetch and load a 16-bit pixel into a register t0 of a GPU:

tex t0

As part of fetching the 16-bit pixel and loading it into the register t0, the unpacking routine 600 may also instruct the pixel shader to perform an operation to isolate each channel (e.g., red, green, blue, and alpha) associated with the fetched pixel. In this way, the unpacking routine 600 can identify each channel of the fetched pixel, for example, as follows:

t0.a=alpha, t0.r=red, t0.g=green, t0.b=blue, wherein t0.a represents an alpha channel component of the t0 register, t0.r represents a red channel component of the t0 register, t0.g represents a green channel component of the t0 register, and t0.b represents a blue channel component of the t0 register. In some embodiments where the pixel shader register size does not match the pixel size, the values associated with the fetched pixel may be expanded as needed. For example, in a pixel shader having 32-bit registers, with eight bits to each channel, the 16-bit pixels may be expanded to thirty-two bits inside the pixel shader so that each 4-bit value of the 16-bit pixel is stored internally as eight bits.

After fetching the 16-bit pixel and storing its value in the appropriate components of the t0 register, the unpacking routine 600 assumes the fetched 16-bit pixel contains information relating to four "overlapping" glyphs (e.g., each channel of the 16-bit pixel contains a 4-bit value). Accordingly, the unpacking routine 600 continues at block 602, where the routine 600 performs additional processing to isolate the channel containing the value for the desired glyph. For example, the unpacking routine 600 may use a dot product (dp) instruction to combine each 16-bit pixel with a mask value that is specifically crafted to preserve the desired 4-bit values associated with the other three channels. In one embodiment, the pixel shader instruction used to perform the masking operation may appear as follows:

dp4 r0.a, t0.rgba, c0.rgba, where r0.a is the channel of the output register in which the desired 4-bit value will be stored when the operation is complete, t0 is the register containing the fetched 16-bit pixel, and c0 is a pixel shader constant that holds the mask value (which is typically supplied by the application that contains the compressed texture). In an alternate embodiment, for example, where the pixel shader does not support a 4-channel dot product instruction (dp4), the dp4 instruction may be replaced by a 3-channel dot product instruction (dp3) followed by a multiply-and-add (mad) instruction to extend the dot product operation to the fourth channel:

dp3 r0.a, t0.rgb, c0.rgb mad r0.a, t0.a, c0.a, r0.a.

As per the above instructions, the 4-bit value corresponding to the desired glyph is stored in the alpha component (r0.a) of the r0 register.

The unpacking routine 600 continues at decision block 603, where the routine 600 conducts a test of the desired 4-bit value, now stored in r0.a, to determine if it represents a white/gray pixel or a black/transparent pixel. If at decision block 603 the 4-bit value is a white/gray pixel (e.g., 1XXX), the unpacking routine 600 proceeds to block 604 to set the corresponding RGB values by removing the most significant bit, shifting the remaining three bits one bit to the left, and then storing the resulting 4-bit value in each of the RGB channels (e.g., r0.r, r0.g, r0.b).

If, however, at decision block 603 the 4-bit value is a black/transparent pixel (e.g., 0XXX), the unpacking routine 600 continues at block 605 to set each of the RGB values of the 4-bit value (stored in r0.r, r0.g, and r0.b, respectively) to zero. The unpacking routine 600 then sets the alpha value of the 4-bit value (stored in r0.a) by removing the most significant bit, shifting the remaining lower bits one bit to the left, and then storing the resulting 4-bit value in the alpha channel (r0.a).

In some embodiments, the pixel shader used in implementing the unpacking routine 600 may not typically perform bitwise operations. The DirectX 8 pixel shader is an example of such a pixel shader. In such cases, other types of operations and register modifiers may be used to isolate and test bits and to shift bits to the left/right. For example, a series of condition (cnd) instructions and register shift modifiers may be used to cause the pixel shader to perform the operations described above with respect to blocks 603-605 (e.g., testing the most significant bit of the 4-bit value, shifting bits as needed, and storing output values in the appropriate RGBA channels). Accordingly, in some embodiments, the corresponding pixel shader instruction may appear as follows:

cnd r0.rgb, r0.a, r0_bx2.a, zero.rgb+cnd r0.a, r0.a, one.a, r0.a

The "+" sign before the second instruction indicates to the pixel shader that this instruction can be paired with the previous instruction, allowing the pixel shader to simultaneously execute the two instructions. This may be possible if the hardware is capable of simultaneously executing RGB-only instructions and alpha-only instructions. Pairing instructions in this way may improve performance.

At decision block 606, the unpacking routine 600 determines whether the originally fetched pixel (still stored in register t0) represents a pixel for a custom glyph (which is stored in the texture using its full 16-bit-per-pixel format during packing) or whether it contains information relating to four "overlapping" glyphs, with a 4-bit value for each glyph stored in the respective RGBA channel of the 16-bit pixel (as assumed by the unpacking routine 600 in blocks 602-605). Some pixel shaders may provide instructions that allow decision block 606 to be performed prior to the processing that occurs in blocks 602-605. For example, such a routine may test whether a flag corresponding to the glyph of the fetched pixel was set during packing (e.g., block 303 of the packing routine 300 of FIG. 3). However, the pixel shader of the illustrated embodiment is not configured for such flag testing and, thus, uses a linear interpolation operation (lrp) to scale between the t0 register (containing the originally fetched 16-bit value, which is used in the case of a custom glyph) and the r0 register (containing the value processed according to blocks 602-605) after the processing of blocks 602-605 has occurred. In some embodiments, the pixel shader instruction for the linear interpolation may resemble the following:

lrp r0, c1.a, t0, r0

This linear interpolation instruction is applied to all four RGBA channels, expanding to:

$r0.r=(c1.a)*t0.r+(1-c1.a)*r0.r$ $r0.g=(c1.a)*t0.g+(1-c1.a)*r0.g$ $r0.b=(c1.a)*t0.b+(1-c1.a)*r0.b$ $r0.a=(c1.a)*t0.a+(1-c1.a)*r0.a$

Depending on the value of c1.a, as a result of this linear interpolation instruction, the unpacking routine 600 either updates the RGBA values in the r0 register to be equivalent to the contents of t0 (where c1.a=1)(block 607) or retains the processed value stored in r0 for the output.

The unpacking routine 600 continues at optional block 608 where it applies coloring to an otherwise white or gray pixel. For example, the unpacking routine 600 may perform modulation of the output based on a desired output color. In the illustrated embodiment, this may involve multiplying the output value stored in r0 by a vertex color value (e.g., stored in register v0) or a pixel shader constant (e.g., c2) containing information for the desired color. At block 609, the unpacking routine 600 outputs the value stored in register r0 as an output pixel. The unpacking routine 600 then proceeds to decision block 610, where it checks to determine whether a next pixel should be fetched to complete the glyph. If a next pixel should be fetched, the unpacking routine 600 loops back to block 601. Otherwise, the unpacking routine 600 ends (with the output stored in register r0).

In some embodiments, the unpacking routine 600 described above may work in conjunction with a spacing and positioning routine (not shown). The spacing and positioning routine may reference a second file that contains the spacing and bounding information for each glyph as used in the application. For example, when rendering the letter "A," the pixel shader may reference a table to find the bounding rectangle for the letter "A" in the font texture. After drawing all pixels for the letter using the unpacking routine 600, the drawing position is advanced depending on the spacing for that letter.

(2) Eight Bit-Per-Pixel to Two Bit-Per-Pixel Compression

Figure 7:
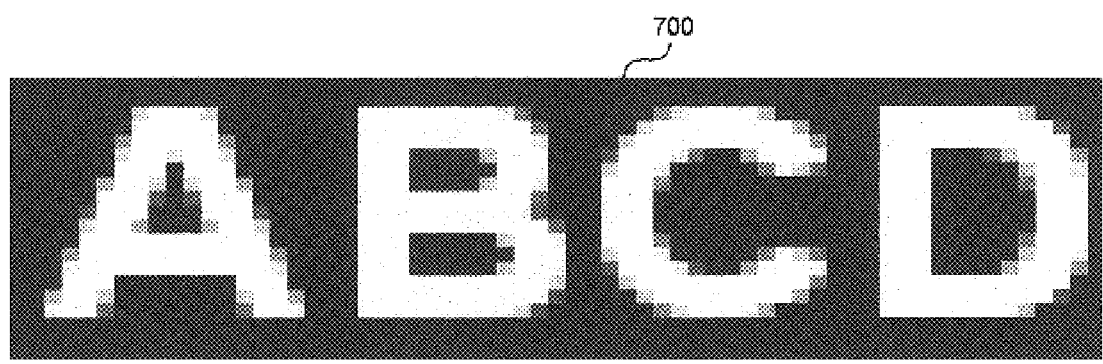
FIG. 7 is a display diagram showing an example of font characters that can be compressed down into a 2-bits-per-pixel format in one embodiment.

FIGS. 7-10 correspond to techniques for packing and unpacking fonts having pixels that can be compressed down to as few as two bits while still retaining features such as anti-aliasing. FIG. 7 shows an example of a texture bitmap 700 containing such a font. For textures configured in this format, the color value for every pixel may be white. To allow for anti-aliasing effects, white pixels near the outside of each glyph may be assigned a transparency value so that such pixels appear to fade into a colored background.

While such bitmaps are typically saved as 32-bit Targa files having eight bits of alpha (allowing for 256 unique alpha values), in some embodiments, the number of unique alpha values is reduced to four (e.g., 100% opaque (white), 66% opaque, 33% opaque, and transparent). The four unique alpha values can then be encoded into two bits as follows:

11: RGB=white, Alpha=100% opaque (white)

10: RGB=white, Alpha=66% opaque

01: RGB=white, Alpha=33% opaque

00: RGB=white, Alpha=0% (transparent)

Figure 8:
FIG. 8 is a display diagram showing an example of a texture bitmap that has been compressed from eight bits-per-pixel down to two bits-per-pixel in one embodiment.

A texture bitmap that is packed into the above format (e.g., using a packing tool that performs bitwise operations) may then be used in an application (e.g., a video game application). FIG. 8 provides a visual example of a 2-bit-per-pixel compressed texture bitmap 800.

Like the packing routine 300 that packs 16-bit pixels into 4-bit values by packing values into respective RGBA channels of 16-bit pixels, a 2-bit packing routine creates an 8-bit texture having two bits for each RGBA channel. At the same time, the 2-bit packing routine creates a palette (or other form of table-lookup component) that facilitates the unpacking of this value in a conventional GPU pixel shader at application run time. More specifically, the 2-bit packing routine may use a palette format that is already recognized by a conventional pixel shader, such as a 256-color palette, which contains an array of 32-bit color values. In some embodiments, the lookup palette is algorithmically generated such that the following mapping is obeyed for each of the 2-bit values in the compressed texture:

| RR | RRRRRRRR |
|----|----------|
| 00 | 00000000 |
| 01 | 01010101 |
| 10 | 10101010 |
| 11 | 11111111 |
| GG | GGGGGGGG |
| 00 | 00000000 |
| 01 | 01010101 |
| 10 | 10101010 |
| 11 | 11111111 |
| BB | BBBBBBBB |
| 00 | 00000000 |
| 01 | 01010101 |
| 10 | 10101010 |
| 11 | 11111111 |
| AA | AAAAAAAA |
| 00 | 00000000 |
| 01 | 01010101 |
| 10 | 10101010 |
| 11 | 11111111 |

Thus, for example, if the particular combination of glyphs being used generates an 8-bit pixel having the value 00 10 11 10, then the packing routine assigns this value to a corresponding 32-bit color value (e.g., 00000000 10101010 11111111 10101010) from the color palette during packing.

Figure 9:
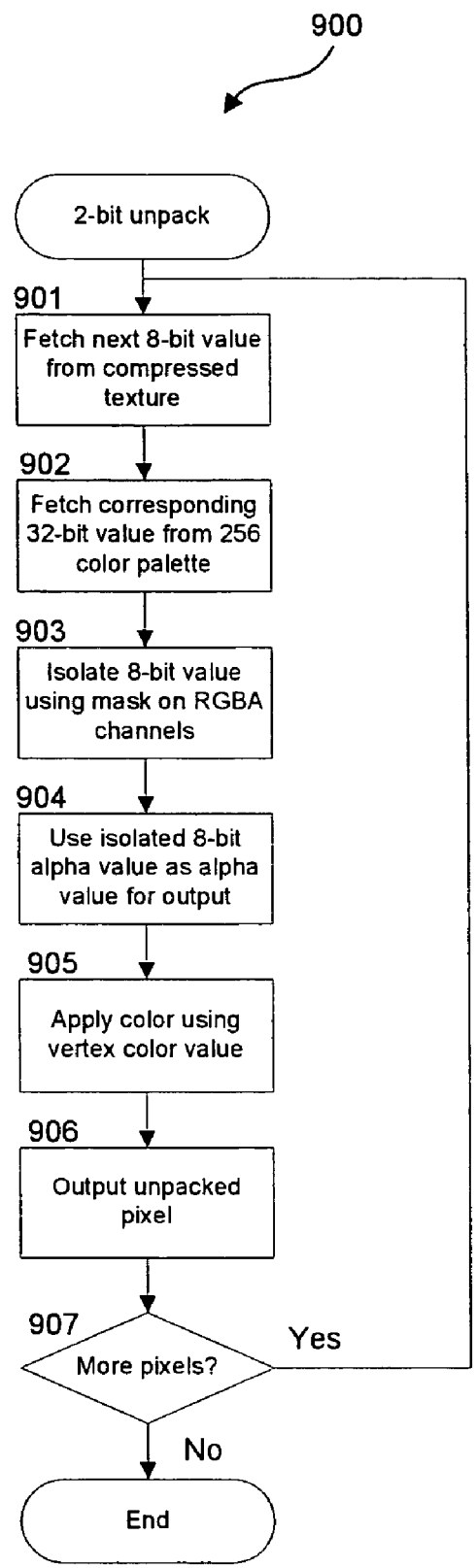
FIG. 9 is a flow diagram showing an example of a routine for unpacking a texture that has been compressed down to two bits-per-pixel.

FIG. 9 is a flow diagram showing a routine 900 that allows for unpacking of a compressed 2-bit-per-pixel texture without the use of bitwise operations (thus allowing for unpacking by a conventional pixel shader/GPU that does not typically perform bitwise operations). In some embodiments, the unpacking routine 900 uses a 256-color palette for a lookup tool, as described above. However, one skilled in the art would recognize that other implementations may be possible, such as a dependent texture read implementation, where an unpacking routine fetches a value from one texture and uses that value to compute texture coordinates that are, in turn, used to fetch a value from a second texture.

At block 901, the unpacking routine 900 fetches an 8-bit pixel from the compressed texture, with the 8-bit pixel having four distinct 2-bit values (e.g., one per RGBA channel of the packed texture), as follows:

RRGGBBAA

At block 902, the unpacking routine 900 fetches a corresponding 32-bit value from the 256-color palette, with the 32-bit value having four distinct 8-bit values (e.g., one per each RGBA channel), as follows:

RRRRRRRRGGGGGGGGBBBBBBBB-BAAAAAAAA

Thus, each of the 2-bit pixels from the 8-bit pixel is conveniently translated and separated into four 8-bit values, one for each RGBA channel, which can be easily handled by the conventional pixel shader. Because these four 8-bit values may belong to four separate glyphs, at block 903 the unpacking routine 900 isolates the 8-bit value belonging to the desired glyph. For example, the unpacking routine 900 may perform a masking operation, similar to the dp4 masking operation 602 of FIG. 6. At block 904, the unpacking routine 900 uses the isolated 8-bit value as an 8-bit alpha (transparency) value for the soon-to-be-outputted unpacked pixel. At block 905, the unpacking routine 900 uses a vertex color stored in register v0 as a value for the RGB channel. For example, the unpacking routine 900 may perform a multiply operation similar to the multiply operation 608 of FIG. 6.

At block 906, the unpacking routine 900 outputs the unpacked pixel. The unpacking routine 900 then proceeds to decision block 907, where it checks to determine whether a next pixel should be fetched to complete the glyph. If a next pixel should be fetched, the unpacking routine 900 loops back to block 901. Otherwise, the unpacking routine 900 ends.

While text rendered with the 2-bit unpacking routine 900 may lack outlining and drop-shadowing effects, such effects can be incorporated by rendering the text multiple times. For example, text with a drop-shadow is drawn first as black text with a 2-pixel offset, and second as white (or colored) in the original position. An example of outlined and drop-shadowed text rendered using this technique is illustrated in FIG. 10.

The font in the 2-bit packed bitmap 1000 shown in FIG. 10 is anti-aliased, so round edges have a minimized "stair-stepped" effect. Also, as shown, the font scales well, which is desirable for use in games that display fonts as different sizes. Even when a font is packed into just two bits-per-pixel, font scaling may still be possible because the hardware texture filtering takes places after the palette lookup (e.g., after the lookup, each value is in a separate RGBA channel, and the hardware filters each channel separately).

In some embodiments, embedded pre-colored (e.g., custom) images may be included in the compressed texture bitmaps by using images that can be drawn using a limited color set (e.g., colors available from the 256-color palette—i.e., four colors of red, four colors of green, four colors of blue, and four values of alpha).

(3) 8 Bits-Per-Pixel to 1 Bit-Per-Pixel Compression

With some applications it is desirable to take every step possible to reduce memory usage. In such cases, techniques for packing 8-bits-per-pixel fonts down to 1 bit-per-pixel (while still supporting 8,000+ character fonts) may provide a significant advantage, despite the possible drawback of not easily supporting anti-aliasing.

For the 1-bit case, a font packing routine may set all colored pixels to 1, and all transparent pixels to 0 (or vice versa). In some embodiments, the font packing routine packs symbols eight layers deep, so that each 8-bit pixel in the texture is shared by up to eight distinct 1-bit values belonging to eight separate symbols. This configuration means that each RGBA channel (assigned two bits each) may contain information for two separate glyphs, in four possible combinations (00, 01, 10, or 11). At the same time, the 1-bit packing routine may create a mapping in a lookup table (e.g., a 256-color palette) that facilitates the unpacking of this value in a GPU pixel shader at application run time. For example, in some embodiments, a 256-color palette is algorithmically generated such that the following mapping is obeyed for each pair of 1-bit values in the compressed texture:

| $R_1R_2$ | RRRRRRRR |
|---|---|
| 00 | 00000000 |
| 01 | 01010101 |
| 10 | 10101010 |
| 11 | 11111111 |
| $G_1G_2$ | GGGGGGGG |
| 00 | 00000000 |
| 01 | 01010101 |
| 10 | 10101010 |
| 11 | 11111111 |
| $B_1B_2$ | BBBBBBBB |
| 00 | 00000000 |
| 01 | 01010101 |
| 10 | 10101010 |
| 11 | 11111111 |
| $A_1A_2$ | AAAAAAAA |
| 00 | 00000000 |
| 01 | 01010101 |
| 10 | 10101010 |
| 11 | 11111111 |

Figure 11:
FIG. 11 is a display diagram showing an example of a texture bitmap that has been packed down to one bit-per-pixel in one embodiment.

According to the above mapping scheme, each 8-bit pixel in the compressed texture bitmap may have four sets of values (e.g., R, G, B, and A), each containing two values that each represent a pixel of a different glyph (e.g., $R_1R_2G_1G_2B_1B_2A_1A_2$). FIG. 11 provides a visual example of a 1-bit-per-pixel compressed texture bitmap 1100.

Figure 12:
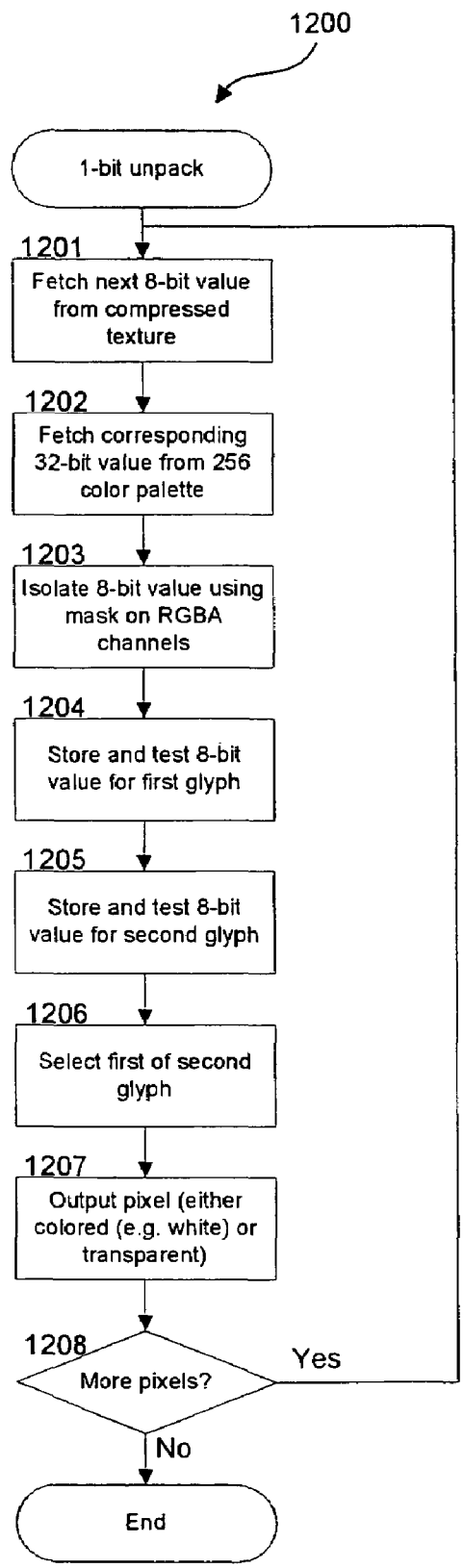
FIG. 12 is a flow diagram showing an example of a routine for unpacking a texture bitmap that has been packed down to one bit-per-pixel in one embodiment.

FIG. 12 is a flow diagram showing a routine 1200 that allows for unpacking of a compressed 1 bit-per-pixel texture without the use of bitwise operations (thus allowing for unpacking by a conventional pixel shader/GPU). The 1-bit unpacking routine 1200 uses a per-pixel lookup table, which may be implemented using a 256-color palette that is indexed with an 8-bit value from the original (noncompressed) texture. However, one skilled in the art would recognize that other implementations may be possible, such as a dependent texture read implementation, where a routine fetches a value from one texture and uses that value to compute texture coordinates that are, in turn, used to fetch a value from a second texture.

At block 1201, the 1-bit unpacking routine 1200 fetches an 8-bit value from the compressed texture, with the 8-bit value having eight distinct 1-bit values (e.g., two per RGBA channel). For example, each channel may have two bits, each representing a pixel of a different glyph (e.g., $R_1R_2G_1G_2B_1B_2A_1A_2$). While only one of these eight 1-bit values corresponds to a pixel of the desired glyph, in some embodiments, initial processing by the unpacking routine 1200 involves processing of all eight bits. Accordingly, at block 1202, the routine 1200 fetches a corresponding 32-bit value from the palette, with the 32-bit value having four distinct 8-bit values (e.g., RRRRRRRR, GGGGGGGG, BBBBBBBB, AAAAAAAA). For example, when the mapping is applied to a fetched 8-bit value comprising the bits 10 01 01 11, the resulting 32-bit value may be 10101010 01010101 01010101 11111111, which is shown broken down by RGBA inner value in the following table:

| $R_1R_2$ | 10 | 10101010 |
|---|---|---|
| $G_1G_2$ | 01 | 01010101 |
| $B_1B_2$ | 01 | 01010101 |
| $A_1A_2$ | 11 | 11111111 |

At block 1203, the unpacking routine 1200 identifies one of the four RGBA channels from the 32-bit value to isolate the 8-bit inner value that corresponds to a pixel of the desired glyph. For example, the unpacking routine 1200 may perform a masking operation, similar to the dp4 masking operation 602 of FIG. 6. At this point, the unpacking routine 1200 is left with an 8-bit value that represents information for two pixels, including the pixel of the desired glyph. For example, with reference to the above table, if the masking operation isolates the inner value associated with the blue channel, the unpacking routine 1200 is left with the inner value 01010101, which corresponds to the first of the two possible glyphs.

At block 1204, the unpacking routine 1200 may store and test the isolated inner value as it relates to the first one of the two possible glyphs. For example, the unpacking routine 1200 may store the 8-bit inner value in a first register channel (e.g., r0.a) and test the most significant bit of the 8-bit inner value to check whether it corresponds to a colored portion of a glyph or a noncolored portion of the glyph. Similarly, at block 1205, the unpacking routine may store and test the isolated inner value (or a biased version of the isolated inner value) as it relates to the second one of the two possible glyphs. For example, the unpacking routine 1200 may store the 8-bit inner value (or a biased version of the 8-bit inner value) in a second register channel (e.g., r1.a) and test the second-most significant bit to check whether it corresponds to a colored portion of a glyph or a noncolored portion of the glyph. The pixel shader instruction used to perform the operations of blocks 1204 and 1205 may be as follows:

cnd_x2r1.a, r0.a, r0_bias.a, r0.a

This can be written in pseudo-code as:

$r1.a = 2*(r0.a?(r0.a-0.5), r0.a)$

In the pixel shader, since the value 0.5 corresponds to binary 8-bit value of 10000000, subtracting a value by 0.5 effectively removes the high bit from that value. Therefore, the above pseudo-code can be interpreted as:

```
If the high-bit of r0.a is set
    Then
        Subtract r0.a by 0.5 to remove the high-bit
    Else
        Keep r0.a as is
Shift result by one bit left and store in r1.a
```

At block 1206, the unpacking routine 1200 selects either the value that corresponds to the first glyph (e.g., the value stored in r0.a) or the value that corresponds to the second glyph (e.g., the value stored in r1.a). The pixel shader instruction used to perform this operation may be as follows:

Irp r0.a, c1.a, r0.a, r1.a

At block 1207, the unpacking routine 1200 outputs either a colored (e.g., white) or noncolored pixel based on the above processing. The high-bit of r0.a is used to set transparency. The corresponding pixel shader instructions used to perform this operation may be as follows:

mov r0.rgb, v0.rgb+cnd r0.a, r0.a, one.a, zero.a.

While not shown as a separate block, like the 2-bit unpacking routine 900, the 1-bit unpacking routine 1200 may apply a specific color to a colored pixel (using, for example, a vertex color application technique). The unpacking routine 1200 then proceeds to decision block 1208, where it checks to determine whether a next pixel should be fetched to complete the glyph. If a next pixel should be fetched, the unpacking routine 1200 loops back to block 1201. Otherwise, the unpacking routine 1200 ends.

Using 1-bit compression may provide significantly enhanced memory savings. For example, a Chinese font with 8000 characters each occupying 16×16 pixels can fit in a mere 256 KB. Larger characters at 20×20 pixels can fit in 400 KB. In some embodiments it is possible to keep a 1-bit font for text-heavy situations (like dialogue, which requires all 8000 characters), along with a 2-bit font that can scale for other uses (like menus and user interfaces) that depend on a smaller subset of characters. In addition, as with the 2-bit compressed font, outlining and/or drop-shadowing effects can be achieved with a 1-bit-per-pixel texture bitmap by rendering the text multiple times (e.g., first as black text with a 2-pixel offset, and second as white (or colored) in the original position).

IV. CONCLUSION

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Where the context permits, words in the above Detailed Description using the singular or plural number may also include the plural or singular number, respectively.

The teachings of the invention provided herein can be applied to other systems, not necessarily the system described herein. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the content sharing system and spam control and privacy management techniques may vary considerably in their implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

I claim:

1. A method performed by a computing system for reducing a number of bits used to store symbols in a texture used for rendering three-dimensional graphics, including text symbols, for display in a two-dimensional space, the method comprising:

receiving an uncompressed texture bitmap including text symbols that include at least one of outlining features, drop-shadowing features, and anti-aliasing features, wherein the uncompressed texture bitmap uses pixels having a 16-bit-per-pixel format;

packing the uncompressed texture bitmap into a compressed texture bitmap, wherein the compressed texture bitmap stores pixel information using a 4-bit format and wherein text symbols rendered using pixel information stored in the 4-bit format retain any outlining features, drop-shadowing features, and anti-aliasing features; and storing the compressed texture bitmap on a computer-readable medium from which it can be rendered for display.

2. The method of claim 1 wherein the packing of the uncompressed texture bitmap includes:

packing a first pixel associated with a first text symbol into a red channel of a 16-bit pixel in accordance with the 4-bit format;

packing a second pixel associated with a second text symbol into a green channel of the 16-bit pixel in accordance with the 4-bit format;

packing a third pixel associated with a third text symbol into a blue channel of the 16-bit pixel in accordance with the 4-bit format; and packing a fourth pixel associated with a fourth text symbol into an alpha channel of the 16-bit pixel in accordance with the 4-bit format.

3. The method of claim 1, wherein the uncompressed texture bitmap includes at least one custom pre-colored glyph comprised of pixels having a 16-bit-per-pixel format, and wherein the 16-bit-per-pixel format of the pixels of the at least one colored glyph is preserved in the compressed texture bitmap.

4. A method performed by a computing system for reducing a number of bits used to store symbols in a texture used for text rendering in a video game application that displays three-dimensional graphics, including text symbols, in a two-dimensional space, the method comprising:

receiving a first 16-bit-per-pixel texture bitmap including multiple symbols,
wherein the multiple symbols include:
a set of symbols including one or more text characters having at least one of anti-aliasing effects, outlining effects, and drop-shadow effects;
based on the first 16-bit-per-pixel texture bitmap, generating a second 16-bit-per-pixel texture bitmap that includes each of the multiple symbols of the first 16-bit-per-pixel texture bitmap,
wherein each pixel of the first 16-bit-per-pixel texture bitmap and each pixel of the second 16-bit-per-pixel texture bitmap is comprised of four channels including a 4-bit red channel, a 4-bit green channel, a 4-bit blue channel, and a 4-bit alpha channel,
wherein each of the multiple symbols is represented in the first 16-bit-per-pixel texture bitmap using multiple 16-bit pixels, with each of the multiple 16-bit pixels represented using all four channels of a 16-bit pixel of the first 16-bit-per-pixel texture bitmap,
wherein each symbol of the set of symbols is represented in the second 16-bit-per-pixel texture bitmap using multiple 4-bit values, with each of the multiple 4-bit values represented using a single channel of a 16-bit pixel of the second 16-bit-per-pixel texture bitmap, and
wherein each 16-bit pixel of the second 16-bit-per-pixel texture bitmap is configured to store up to four 4-bit values, wherein a first of the up to four 4-bit values represents a pixel from a first symbol and wherein a second of the up to four 4-bit values represents a pixel from a second symbol; and storing the compressed texture bitmap on a computer-readable medium.

5. The method of claim 4 wherein any anti-aliasing effects, outlining effects, or drop-shadow effects of the first set of symbols are present in both the first 16-bit-per-pixel texture bitmap and the second 16-bit-per-pixel texture bitmap.

6. The method of claim 4 wherein the second 16-bit-per-pixel texture bitmap is generated using a font packing tool.

7. The method of claim 4 wherein each value in the second 16-bit-per-pixel texture bitmap represents either a white portion of one of the multiple symbols, a black portion of one of the multiple symbols, a gray portion of one of the multiple symbols, or a transparent portion of one of the multiple symbols.

8. A method performed by a computing system for reducing the number of bits used to store symbols in a texture used for text rendering in a computerized application that displays three-dimensional graphical objects in a two-dimensional space, the method comprising:

receiving a first texture including multiple symbols, wherein the first texture has n bits-per-pixel, where n is a constant integer that is greater than two;

based on the first texture, generating a second texture that includes each of the multiple symbols of the first texture, wherein the second texture has n bits-per-pixel,
wherein each pixel of the first texture and each pixel of the second texture is comprised of m distinct channels, where m is a constant positive integer that is less than n,
wherein each of the multiple symbols is represented in the first texture using multiple n-bit values, and wherein each one of the multiple n-bit values corresponds to one pixel of the first texture, and representing each of at least some of the multiple symbols in the second texture bitmap using multiple n/m-bit values, where n/m is a constant positive integer,
wherein each of the multiple n/m-bit values is represented using exactly one of the multiple distinct channels of a pixel of the second texture bitmap, and
wherein each pixel of the second texture is configured to store m of the multiple n/m-bit values; and storing the compressed texture bitmap on a computer-readable medium.

9. The method of claim 8 wherein n=16 and m=4.

10. The method of claim 8, further comprising representing at least one of the multiple symbols in the second texture bitmap using multiple n-bit values, wherein each one of the multiple n-bit values corresponds to one pixel of the second texture.

11. The method of claim 8 wherein the multiple n/m-bit values are used to output pixels for rendering a three-dimensional text graphic in a two-dimensional space.

12. The method of claim 8, further comprising representing at least one of the multiple symbols in the second texture bitmap using multiple n-bit values, wherein each one of the multiple n-bit values corresponds to one pixel of the second texture, and wherein the multiple n-bit values are used to output pixels for rendering a three-dimensional non-text graphic in a two-dimensional space.

13. A method performed by a computing system for rendering graphical symbols used in the display of three-dimensional graphics in a two-dimensional space, the method comprising:

fetching a first pixel from a texture bitmap, wherein the first pixel is associated with a selected symbol representation, and wherein the texture bitmap includes:

multiple pixels each having a size of n bits, and each having m channels-per-pixel, wherein each of the multiple pixels is configured to store up to m values, where n is a constant integer that is greater than two, and where m is a constant positive integer that is less than n, a set of multiple symbol representations including the selected symbol representation, wherein each symbol representation from the set of multiple symbol representations is defined using multiple values, with each of the multiple values stored in a single channel of a pixel of the texture bitmap such that at least one of the multiple pixels stores values corresponding to up to m different symbol representations;

isolating a desired value from one of the m channels of the fetched pixel, wherein the desired value is associated with the selected symbol representation;

processing the isolated value to determine at least one of a luminance value and a transparency value; and outputting a new pixel based on the processing of the isolated value, wherein the new pixel represents a displayable pixel of the selected symbol representation; and displaying the outputted pixel on a display device.

14. The method of claim 13, further comprising applying a color to the outputted pixel, wherein the applied color is based on a vertex color value associated with the outputted pixel.

15. The method of claim 13 wherein n=16 and m=4, and wherein the processing of the isolated value to determine at least one of a luminance value and a transparency value includes performing an operation equivalent to checking a first bit of the isolated value to determine if it is a member of a set including black and transparent pixels.

16. The method of claim 13 wherein n=16 and m=4, and wherein the processing of the isolated value to determine at least one of a luminance value and a transparency value includes performing an operation equivalent to checking a first bit of the isolated value to determine if it is a member of a set including white and gray pixels.

17. The method of claim 13 wherein n=16 and m=4, and wherein the processing of the isolated value to determine at least one of a luminance value and a transparency value includes performing an operation equivalent to shifting three least significant bits of the value to the left to generate a 4-bit value that corresponds to a luminance value associated with a white or gray pixel.

18. The method of claim 13 wherein n=16 and m=4, and wherein the processing of the isolated value to determine at least one of a luminance value and a transparency value includes performing an operation equivalent to shifting three least significant bits of the value to the left to generate a 4-bit value that corresponds to a transparency value associated with a transparent or opaque pixel.

19. The method of claim 13, further comprising referencing stored data that contains spacing and bounding information for each of the multiple symbol representations in association with outputting the new pixel.

20. A system for text rendering in a computerized application that displays three-dimensional graphics including three-dimensional text, the system comprising:

a pixel shader component for fetching a first pixel from a compressed texture bitmap stored in the application, wherein the first pixel is associated with a selected symbol representation, and wherein the texture bitmap includes:

multiple pixels each having a size n, and each having m channels-per-pixel, wherein each of the multiple pixels is configured to store up to m values, where n is a constant integer that is greater than two, and where m is a constant positive integer that is less than n, a set of multiple symbol representations including the selected symbol representation, wherein each symbol representation from the set of multiple symbol representations is defined using multiple values, with each of the multiple values stored a single channel of a pixel of the texture bitmap such that at least one of the multiple pixels stores values corresponding to up to m different symbol representations;

a graphics processing unit configured for processing the fetched pixel to isolate a desired value from one of the m channels, and processing the isolated value to determine at least one of a luminance value and a transparency value; and an output component configured for outputting a new pixel based on the processing of the isolated value, wherein the new pixel represents a displayable pixel of the selected symbol representation; and a display component for displaying the outputted pixel.

21. The system of claim 20 wherein the graphics processing unit includes a register for storing the fetched pixel, and wherein the register for storing the fetched pixel includes storage for m channels including a red channel, a green channel, a blue channel, and an alpha channel.

22. The system of claim 20 wherein the graphics processing unit includes a register for storing a copy of the isolated pixel during processing, and wherein the register for storing the copy of the isolated pixel includes storage for m channels including a red channel, a green channel, a blue channel, and an alpha channel.

23. The system of claim 20 wherein the graphics processing unit includes a register for storing a constant used as a mask in isolating the desired value.

24. The system of claim 20 wherein the set of multiple symbols includes glyphs representing text in one or more fonts.

* * * * *